US012033572B2

(12) United States Patent
Orio et al.

(10) Patent No.: US 12,033,572 B2
(45) Date of Patent: Jul. 9, 2024

(54) DEVICE AND METHOD FOR DRIVING A DISPLAY PANEL TO IMPROVE VOLTAGE DROP COMPENSATION

(71) Applicant: Synaptics Incorporated, San Jose, CA (US)

(72) Inventors: Masao Orio, Tokyo (JP); Hirobumi Furihata, Tokyo (JP); Takashi Nose, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 46 days.

(21) Appl. No.: 17/521,646

(22) Filed: Nov. 8, 2021

(65) Prior Publication Data

US 2023/0142900 A1 May 11, 2023

(51) Int. Cl.
*G09G 3/3208* (2016.01)

(52) U.S. Cl.
CPC ... *G09G 3/3208* (2013.01); *G09G 2320/0233* (2013.01); *G09G 2320/0242* (2013.01); *G09G 2320/0673* (2013.01)

(58) Field of Classification Search
None
See application file for complete search history.

(56) References Cited

U.S. PATENT DOCUMENTS

| | | | | |
|---|---|---|---|---|
| 2007/0146236 | A1* | 6/2007 | Kerofsky | G09G 3/3611 345/7 |
| 2015/0255019 | A1* | 9/2015 | Park | G09G 3/3225 345/208 |
| 2017/0223233 | A1* | 8/2017 | Jung | H04N 5/202 |
| 2018/0182297 | A1* | 6/2018 | Lee | G09G 3/3258 |
| 2020/0211457 | A1* | 7/2020 | Kim | G09G 3/3225 |
| 2021/0020098 | A1* | 1/2021 | Yum | G09G 3/3208 |
| 2021/0183333 | A1* | 6/2021 | Holland | G09G 3/3208 |
| 2021/0407407 | A1* | 12/2021 | Zhou | G09G 3/3233 |

* cited by examiner

*Primary Examiner* — Benjamin C Lee
*Assistant Examiner* — Emily J Frank
(74) *Attorney, Agent, or Firm* — Leydig, Voit & Mayer, Ltd.

(57) ABSTRACT

A display driver includes image processing circuitry and drive circuitry. The image processing circuitry is configured to determine a total current of a display panel and perform an IR-drop compensation using the total current and a first graylevel for a first subpixel of the display panel to determine a first voltage level for the first subpixel. The drive circuitry is configured to update the first subpixel based at least in part on the first voltage level.

20 Claims, 15 Drawing Sheets

DEVICE AND METHOD FOR DRIVING A DISPLAY PANEL TO IMPROVE VOLTAGE DROP COMPENSATION

FIELD

The disclosed technology generally relates to a display driver, display module and method for driving a display panel.

BACKGROUND

Some sorts of display panels, such as organic light emitting diode (OLED) display panels and micro light emitting diode (LED) display panels, are configured to supply a power source voltage to respective pixels via power source lines. A display panel thus configured may exhibit display mura in a displayed image due to voltage drop across the power source lines in the display panel.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In one or more embodiments, a display driver is provided. The display driver includes image processing circuitry and drive circuitry. The image processing circuitry is configured to determine a total current of a display panel and perform an IR-drop compensation using the total current and a first graylevel for a first subpixel of the display panel to determine a first voltage level for the first subpixel. The drive circuitry is configured to update the first subpixel based at least in part on the first voltage level.

In one or more embodiments, a display device is provided. The display device includes a display panel and a display driver. The display driver is configured to determine a total current of the display panel. The display driver is further configured to perform an IR-drop compensation using the total current and a first graylevel for a first subpixel of the display panel to determine a first voltage level for the first subpixel. The display driver is further configured to update the first subpixel using the first voltage level.

In one or more embodiments, a method for driving a display panel is provided. The method includes determining a total current of a display panel. The method further includes performing an IR-drop compensation using the total current and a first graylevel for a first subpixel of the display panel to determine a first voltage level for a first subpixel of the display panel. The method further includes updating the first subpixel using the first voltage level.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
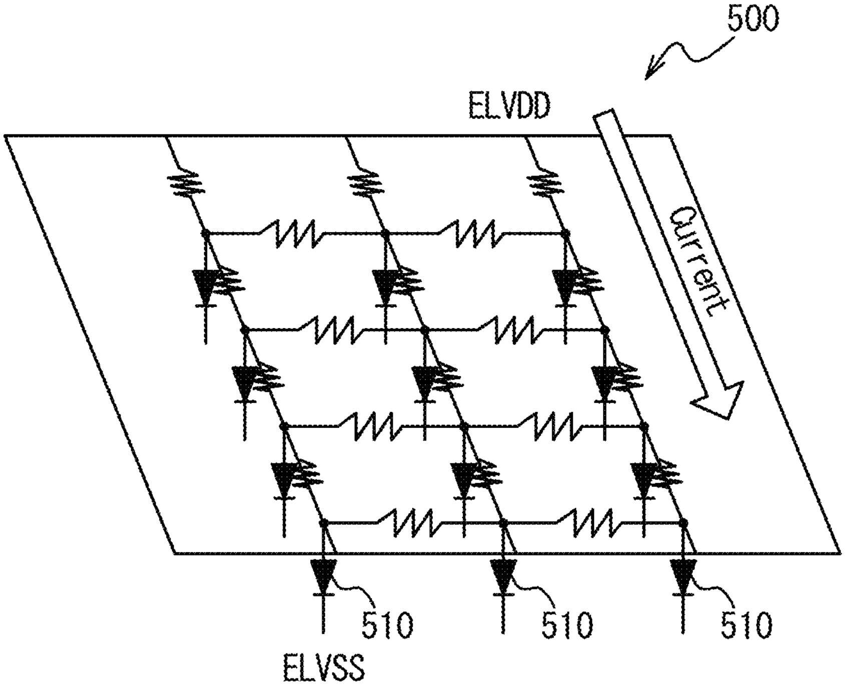
FIG. 1 illustrates an example configuration of a display panel, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Some sorts of display panels, such as organic light emitting diode (OLED) display panels and micro light emitting diode (LED) display panels, are configured to supply a power source voltage to respective subpixels of respective pixels via power source lines. For example, in embodiments where the subpixels include current-driven light emitting elements (e.g., OLED elements), the display panel may be configured to supply a power source voltage to the respective subpixels to drive the current-driven light emitting elements.

FIG. 1 illustrates an example configuration of a display panel 500, according to one or more embodiments. The display panel of FIG. 1 is configured as an organic light emitting diode (OLED) display panel in which each subpixel 510 includes an OLED, which is a sort of current-driven element. To drive the OLEDs in the subpixels 510, the display panel 500 is configured to supply or deliver a power source voltage ELVDD to the respective subpixels via power source lines. "ELVSS" in FIG. 1 refers to a ground voltage.

The display panel 500 thus configured may suffer from display mura in a displayed image due to voltage drop across the power source lines in the display panel 500. The voltage drop may be also referred to as IR-drop, as the voltage drop results from the currents traveling through the power source lines, which function as resistances. The IR-drop across the power source lines may reduce the luminance of the subpixels 510 depending on the position of the subpixel in the display panel and thereby cause display mura.

Figure 2:
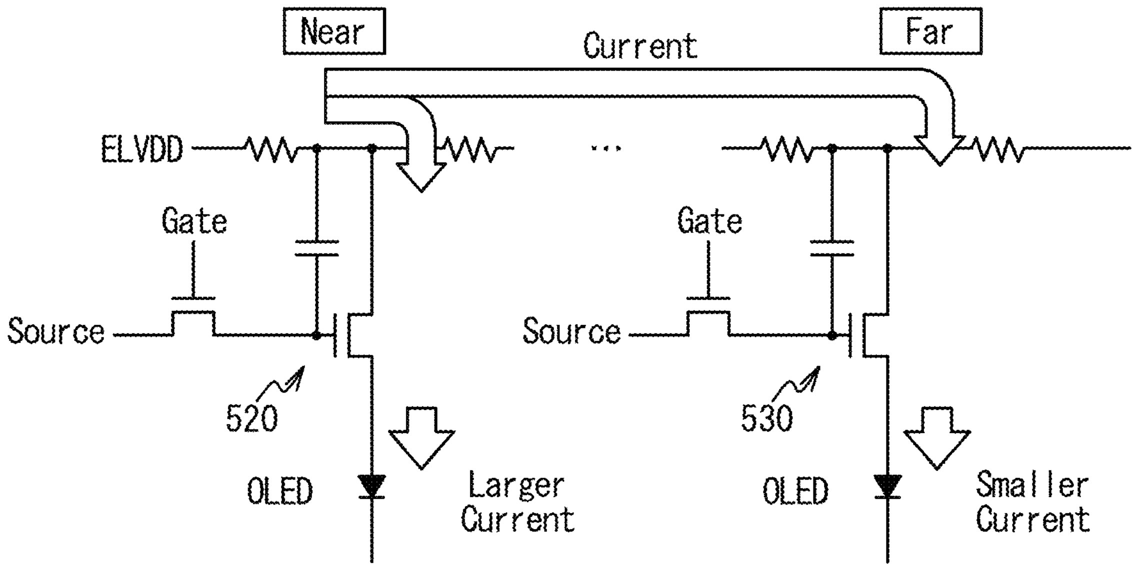
FIG. 2 illustrates example luminance reduction of a pixel, according to one or more embodiments.

The luminance reduction of a subpixel caused by the IR-drop depends on at least two factors: the total current of the display panel and the position of the subpixel in the display panel. The total current referred herein may be the sum of the currents travelling through all the subpixels (12 subpixels 510 are illustrated in FIG. 1) of the display panel. An increase in the total current of the display panel causes an increased voltage drop along the path that delivers the power source voltage to the subpixel, reducing the luminance of the subpixel. Further, as illustrated in FIG. 2, the luminance reduction caused by the IR-drop depends on the positions of the subpixels in the display panel. The length of the path along which the power source voltage ELVDD is supplied to a subpixel is dependent on the position of the subpixel. A subpixel 530 positioned away from the power supply may experience an increased IR-drop over the power source line compared with a subpixel 520 position near the power supply. The increased IR-drop may reduce the current through the subpixel 530, enhancing the luminance reduction.

One approach to mitigate the display mura caused by the IR-drop in the display panel is to use a display driver configured to apply an image process to image data to compensate the IR-drop. The image process to compensate the IR-drop may be hereinafter referred to as IR-drop compensation. The IR-drop compensation may modify the image data depending on expected luminance reductions of the respective pixels caused by the IR-drop. To effectively suppress the display mura, the IR-drop compensation for a subpixel may be based on the total current of the display panel and/or the positions of the subpixels.

The IR-drop compensation based on the total current of the display panel and/or the positions of the subpixels may however cause insufficient compensation for some display images. One example is an image that includes a background image and a foreground image incorporated in the background image where there is a large difference in the luminance between the background image and the foreground image. The foreground image may be a prominent part of the image at least partially surrounded by the background image. High luminance of the background image (e.g., the highest graylevel, typically "255") causes an increased IR-drop in the display panel and the increased IR-drop may make the luminance of the foreground image lower than the luminance specified by image data of the foreground image. The effect of the reduction in the luminance of the foreground image may be enhanced when the specified luminance of the foreground image is low. The IR-drop compensation based on the total current of the display panel and/or the positions of the subpixels may be insufficient to address the effect of the reduction in the luminance of the foreground image. Further, low luminance of the background image (e.g., the lowest graylevel, typically "0") causes a decreased IR-drop in the display panel and the decreased IR-drop may make the luminance of the foreground image higher than the luminance specified by image data of the foreground image. The effect of the increase in the luminance of the foreground image may be enhanced when the specified luminance of the foreground image is high. The IR-drop compensation based on the total current of the display panel and/or the position of the subpixel may be insufficient to address the effect of the increase in the luminance of the foreground image.

Figure 3:
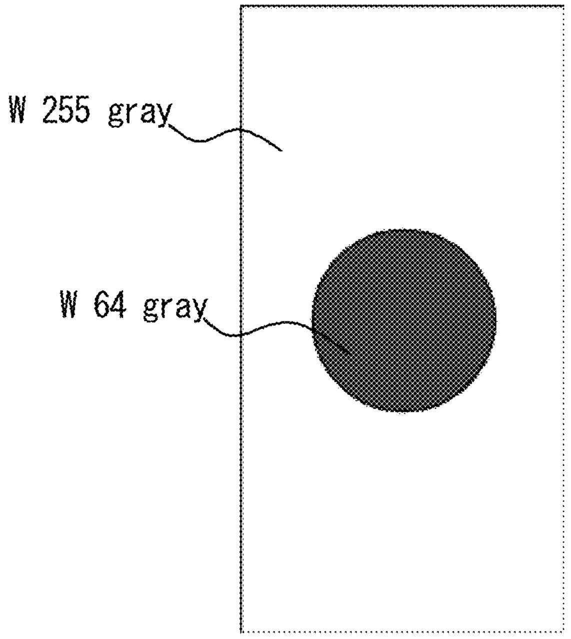
FIG. 3 illustrates an example on-pixel ratio (OPR) image, according to one or more embodiments.

The effect of the luminance difference between a background image and a foreground image can be tested using "on-pixel ratio (OPR)" images. An OPR image may include a background image of a fixed graylevel and a foreground image, e.g., a circular, rectangular or other regular or irregular shaped image, overlayed on the background image. FIG. 3 illustrates an example OPR image in which a circular foreground image, indicated by "W 64 gray", is overlaid on a background image, indicated by "W 255 gray". In FIG. 3 (and also in FIGS. 4A and 4B), "W" stands for an achromatic gray (or white) color in which the graylevels of the red (R), green (G) and blue (B) subpixels are equal, and "64 gray" and "255 gray" stand for graylevels of 64 and 255, respectively, in an 8-bit color depth system. In other words, FIG. 3 illustrates that the foreground image "W 64 gray" is an image of the gray color in which the graylevels of the R, G and B subpixels are 64 while the background image "W 255 gray" is an image of the white color in which the graylevels of the R, G and B subpixels are 255.

Figure 4A:
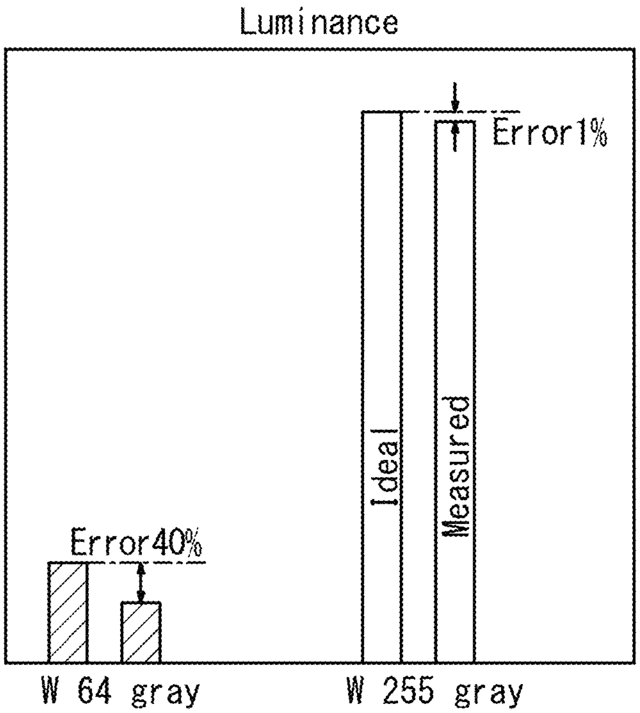
FIG. 4A illustrates an example result of an IR-drop compensation for the display image illustrated in FIG. 3.

Applying an IR-drop compensation to image data for the OPR image illustrated in FIG. 3 may cause an increased luminance error for the foreground image. FIG. 4A illustrates an example result of an IR-drop compensation based on the total current of the display panel and the positions of the subpixels for the display image illustrated in FIG. 3. In the illustrated example, the foreground image experiences a severe luminance error of 40% although the luminance error of the background image is suppressed to 1%.

Figure 4B:
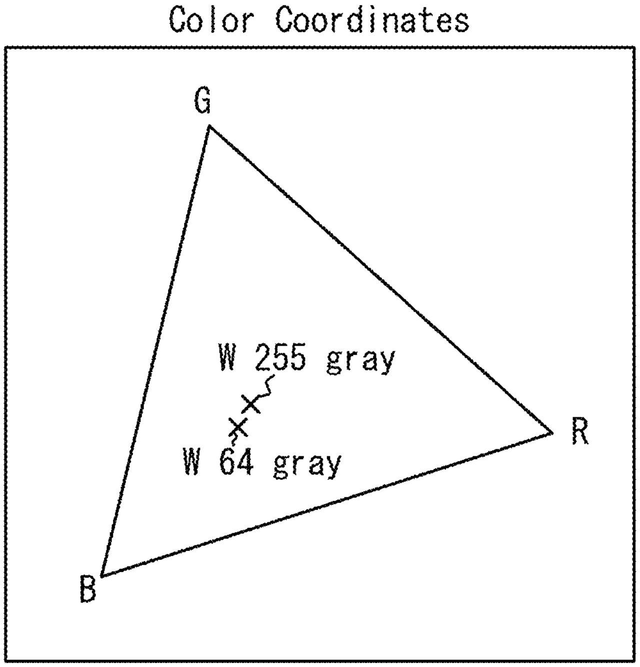
FIG. 4B illustrates color coordinates of a foreground image and a background image for the OPR image illustrated in FIG. 3 after applying an IR-drop compensation.

Further, applying the IR-drop compensation to image data for the OPR image illustrated in FIG. 3 may further cause a color shift of the foreground image. FIG. 4B illustrates color coordinates of the foreground image and the background image for the OPR image illustrated in FIG. 3 after applying an IR-drop compensation based on the total current of the display panel and the positions of the subpixels. In the illustrated example, the foreground image "W 64 gray" suffers from an increased color shift while the background image "W 255 gray" experiences substantially no color shift.

The compensation errors caused by an IR-drop compensation may increase as the luminance difference between the foreground image and the background image increases. FIG.

Figure 4C:
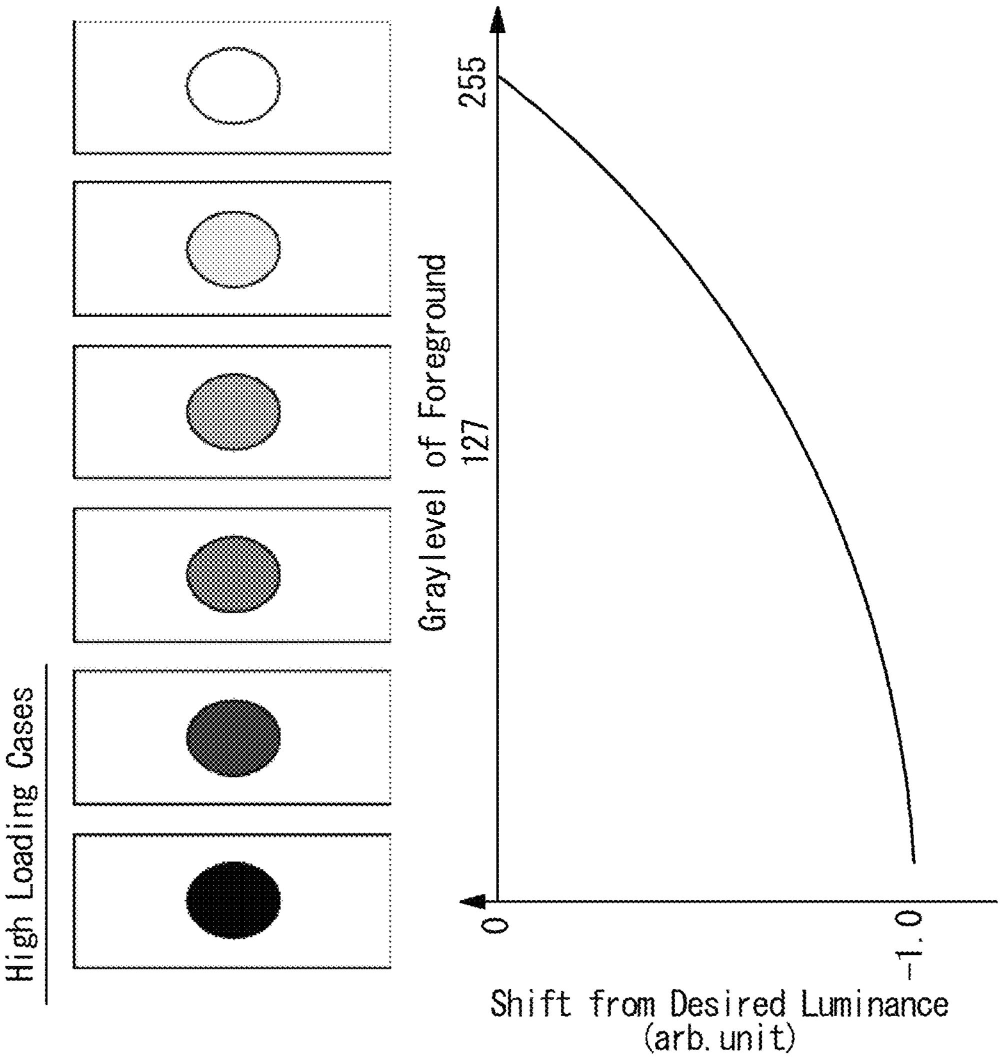
FIG. 4C illustrates example compensation errors of foreground images for "high loading" cases.

4C illustrates example compensation errors of the foreground images for "high loading" cases in which the luminance of the background images is higher than the luminance of the foreground images. In the illustrated example, the graylevels of the subpixels of the background image are the highest graylevel, typically 255, which makes the luminance of the background image maximum. For the "high loading" cases, the measured luminance of the foreground images is lower than the luminance specified by the graylevels of the foreground images, and therefore the polarity of the compensation errors are defined as negative in FIG. 4C. As illustrated in FIG. 4C, the absolute values of the compensation errors increase as the graylevels of the foreground images decrease for the "high loading" cases.

Figure 4D:
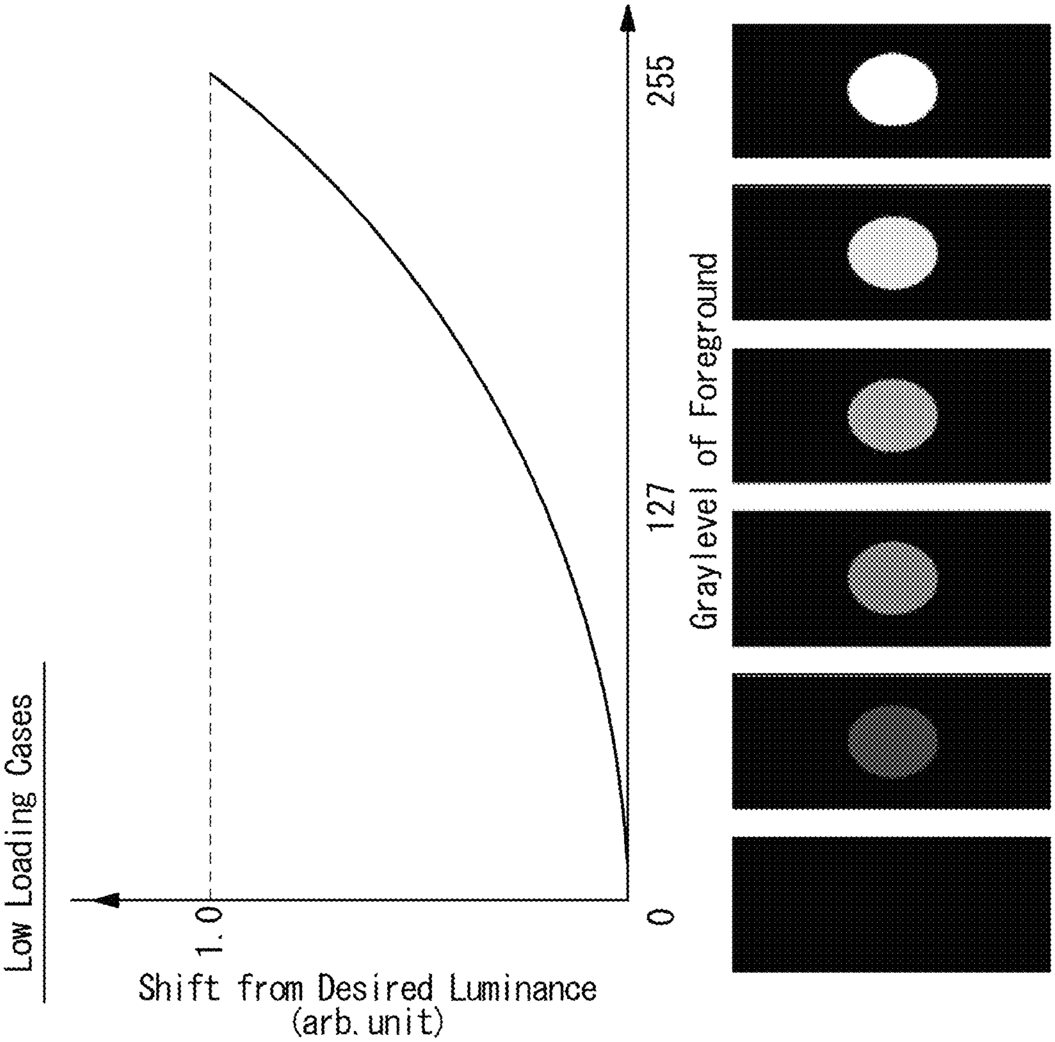
FIG. 4D illustrates example compensation errors of foreground images for "low loading" cases.

FIG. 4D illustrates example compensation errors of the foreground images for "low loading" cases in which the luminance of the background images is lower than the luminance of the foreground images. In the illustrated example, the graylevels of the subpixels of the background image are the lowest graylevel, typically 0, which makes the luminance of the background image minimum. For the "low loading" cases, the measured luminance of the foreground images is higher than the luminance specified by the graylevels of the foreground images, and therefore the polarity of the compensation errors are defined as positive in FIG. 4D. As illustrated in FIG. 4D, the compensation errors increase as the graylevels of the foreground images increase for the "low loading" cases.

The present disclosure provides improved IR-drop compensation technologies to suppress compensation errors and/or color shift. In some embodiments, a display driver includes image processing circuitry and drive circuitry. The image processing circuitry is configured to determine a total current of a display panel. The image processing circuitry is further configured to perform an IR-drop compensation using the total current and a first graylevel for a first subpixel of the display panel to determine a first voltage level for the first subpixel. The drive circuitry is configured to update the first subpixel based at least in part on the first voltage level. The total current at least partially represents the luminance of a background image while the first graylevel for the first subpixel at least partially represents the luminance of a foreground image. The IR-drop compensation using the total current and the first graylevel for the first subpixel may effectively mitigate or suppress compensation errors and/or color shift potentially caused by the difference in the luminance between the background image and the foreground image.

Figure 5:
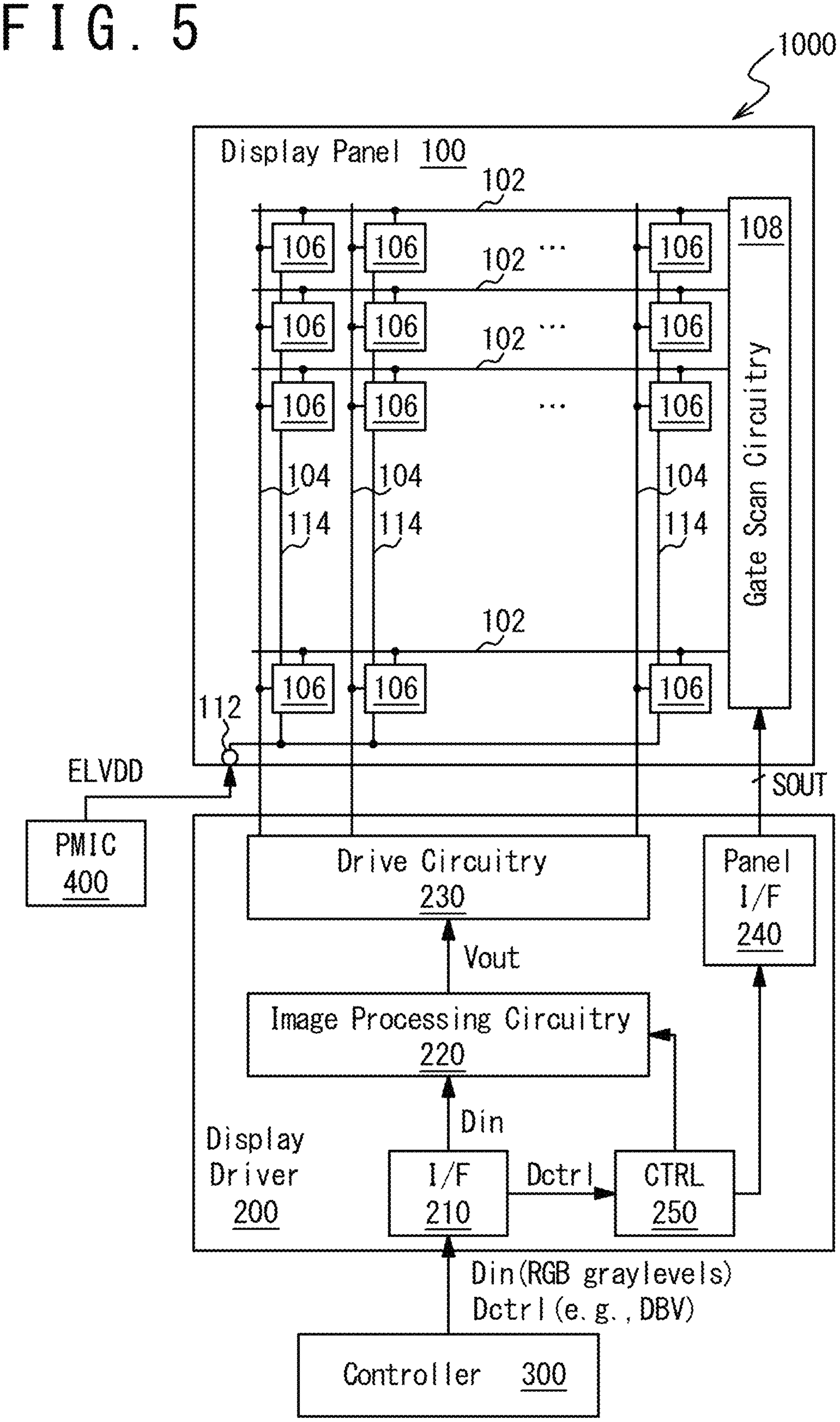
FIG. 5 illustrates an example configuration of a display device, according to one or more embodiments.

FIG. 5 illustrates an example configuration of a display device 1000, according to one or more embodiments. In the illustrated embodiment, the display device 1000 includes a display panel 100 and a display driver 200. Examples of the display panel 100 include OLED display panels and micro LED panels, and display panels implementing various other suitable display technologies.

In one or more embodiments, the display panel 100 comprises gate lines 102, source lines 104, an array of subpixels 106, and gate scan circuitry 108. Each subpixel 106 is connected to a corresponding gate line 102 and source line 104. The gate scan circuitry 108 is configured to scan the gate lines 102 based on gate control signals SOUT received from the display driver 200.

In various embodiments, the display panel 100 includes a power source terminal 112 and power source lines 114. The power source terminal 112 is configured to receive a power source voltage ELVDD from a power management integrated circuit (PMIC) 400. In other embodiments, the power source terminal 112 may be configured to receive the power source voltage ELVDD from power source circuitry integrated in the display driver 200. The power source lines 114 are coupled to the power source terminal 112 and configured to deliver the power source voltage ELVDD to the subpixels 106.

In one or more embodiments, each subpixel 106 is configured to receive the power source voltage ELVDD and operate on the received power source voltage ELVDD. In one or more embodiments, each subpixel 106 comprises an OLED element. In one or more embodiments, the OLED element is configured to emit light when a drive current flows from a power source terminal supplied with the power source voltage ELVDD to circuit ground through the OLED element.

In one or more embodiments, the voltage levels of the power source voltage ELVDD actually supplied to the respective subpixel 106 may be dependent on the subpixels 106 due to voltage drop across the power source lines 114. Variations in the voltage level of the power source voltage ELVDD actually supplied to the subpixels 106 may cause display mura of the display panel 100.

Some of the subpixels 106 are configured to emit light of red (R), some other are configured to emit light of green (G), and still some other are configured to emit light of blue (B). Subpixels 106 configured to emit light of red, green, and blue may be hereinafter referred to as R subpixels, G subpixels, and B subpixels, respectively.

Figure 6A:
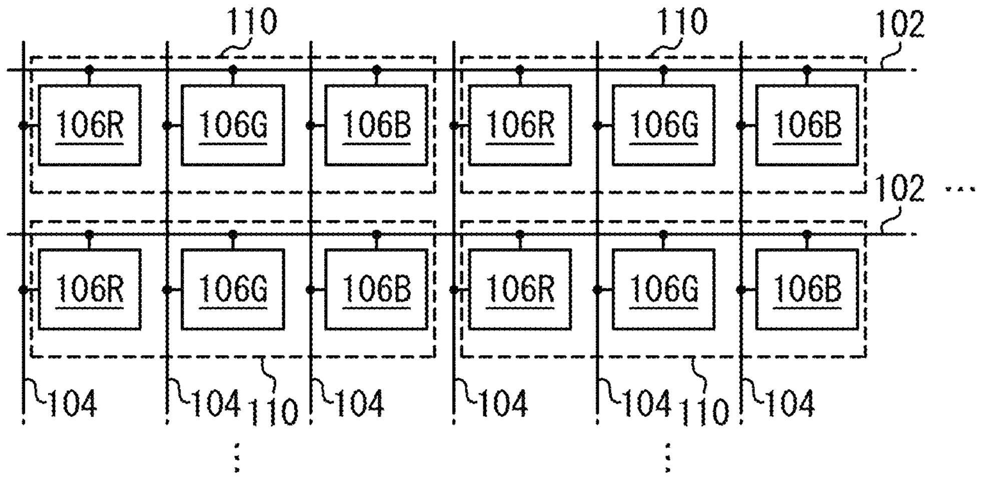
FIG. 6A illustrates an example configuration of pixels, according to one or more embodiments.
Figure 6B:
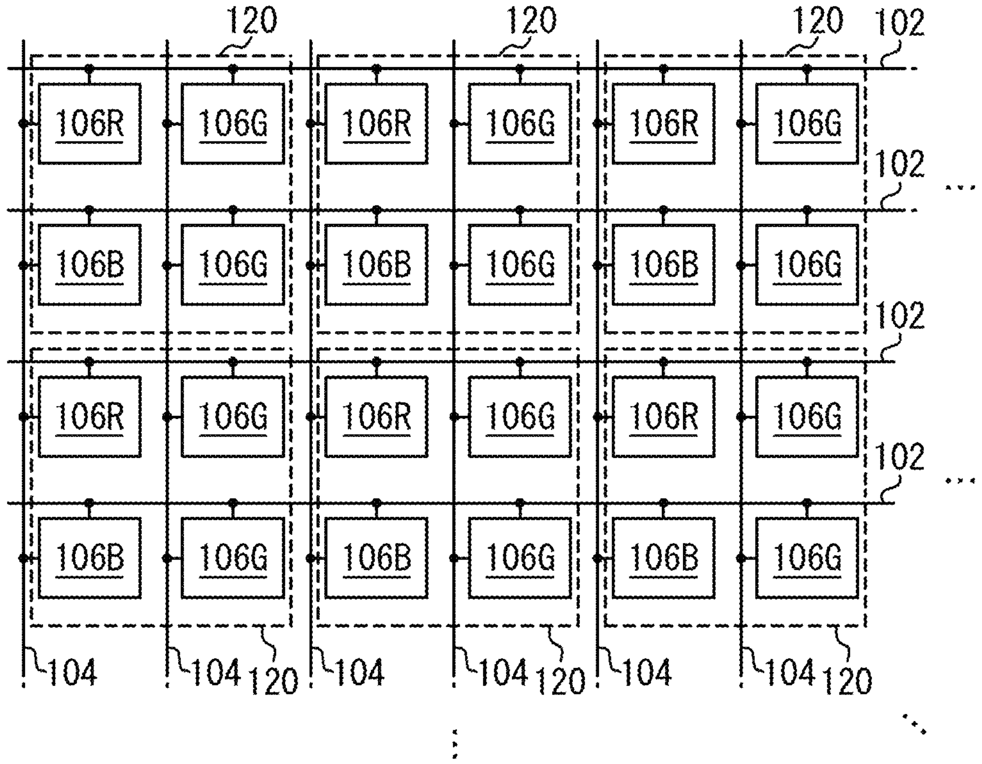
FIG. 6B illustrates an example configuration of pixels, according to one or more embodiments.

In various embodiments, pixels of the display panel 100 each include at least one R subpixel, at least one G subpixel, and at least one B subpixel. FIG. 6A illustrates an example configuration of the pixels, denoted by numeral 110, according to one or more embodiments. In the illustrated embodiments, each pixel 110 includes one R subpixel, denoted by numeral 106R, one G subpixel, denoted by numeral 106G, and one B subpixel denoted by numeral 106B, where the R subpixel 106R, the G subpixel 106G, and the B subpixel 106B are coupled to the same gate line 102. FIG. 6B illustrates another example configuration of pixels, denoted by numeral 120, according to one or more embodiments. In the embodiment illustrated in FIG. 6B, each pixel 120 includes one R subpixel 106R, two G subpixels 106G, and one B subpixel 106B. In some other embodiments, each pixel may further include one or more additional subpixels configured to display one or more colors other than red, green, and blue. Note that the combination of colors is not limited to that disclosed herein.

Referring back to FIG. 5, the display driver 200 is configured to receive image data Din and control data Dctrl from a controller 300 and update the subpixels 106 in the display panel 100 based on the image data Din. The image data Din may include graylevels for the subpixels 106 (which may include R subpixels 106R, G subpixels 106G, and B subpixels 106B illustrated in FIGS. 6A and 6B) of the display panel 100. The control data Dctrl may include control parameters and/or commands that control the operation of the display driver 200. In some embodiments, the control data Dctrl may include a display brightness value (DBV) that specifies a desired display brightness level of the display device 1000. The display brightness level may be the brightness level of the entire image displayed on the display panel 100. In one implementation, the controller 300 is configured to control the overall brightness level of the displayed image by providing the DBV to the display driver 200. The DBV may be generated based on a user operation. For example, when an instruction to adjust the brightness of an image displayed on the display device 1000 is manually input to an input device (not illustrated), the controller 300 may generate the DBV based on this instruction to adjust the display brightness level. The input device may include a touch panel disposed on at least a portion of the display panel 100, a cursor control device, and mechanical and/or non-mechanical buttons.

In one or more embodiments, the display driver 200 includes interface (I/F) circuitry 210, image processing circuitry 220, drive circuitry 230, panel interface (I/F) circuitry 240, and control (CTRL) circuitry 250. The interface circuitry 210 is configured to forward the image data Din received from the controller 300 to the image processing circuitry 220. In other embodiments, the interface circuitry 210 may be configured to process the image data Din and provide the processed image data to the image processing circuitry 220. The interface circuitry 210 is further configured to forward the control data Dctrl to the control circuitry 250.

The image processing circuitry 220 is configured to apply desired image processing to the image data Din to generate resulting voltage data Vout. In one or more embodiments, the resulting voltage data Vout includes voltage levels of drive voltages with which the respective subpixels 106 of the display panel 100 are to be updated. As described later in detail, the image processing performed by the image processing circuitry 220 includes an IR-drop compensation to compensate the IR-drop over the power source lines 114.

The drive circuitry 230 is configured to update the subpixels 106 at least partially based on the resulting voltage data Vout received from the image processing circuitry 220. In one implementation, the drive circuitry 230 is configured to provide drive voltages of the voltage levels specified by the resulting voltage data Vout to the respective subpixels 106 via the source lines 104.

In one or more embodiments, the panel interface circuitry 240 is configured to generate the gate control signals SOUT under the control of the control circuitry 250 and supply the gate control signals SOUT to the gate scan circuitry 108 of the display panel 100.

The control circuitry 250 is configured to provide overall control of the display driver 200. The control circuitry 250 may be configured to provide timing control of respective circuitry in the display driver 200. The control circuitry 250 may be further configured to control the image processing performed by the image processing circuitry 220 based on the control data Dctrl, which may include the DBV.

Figure 7:
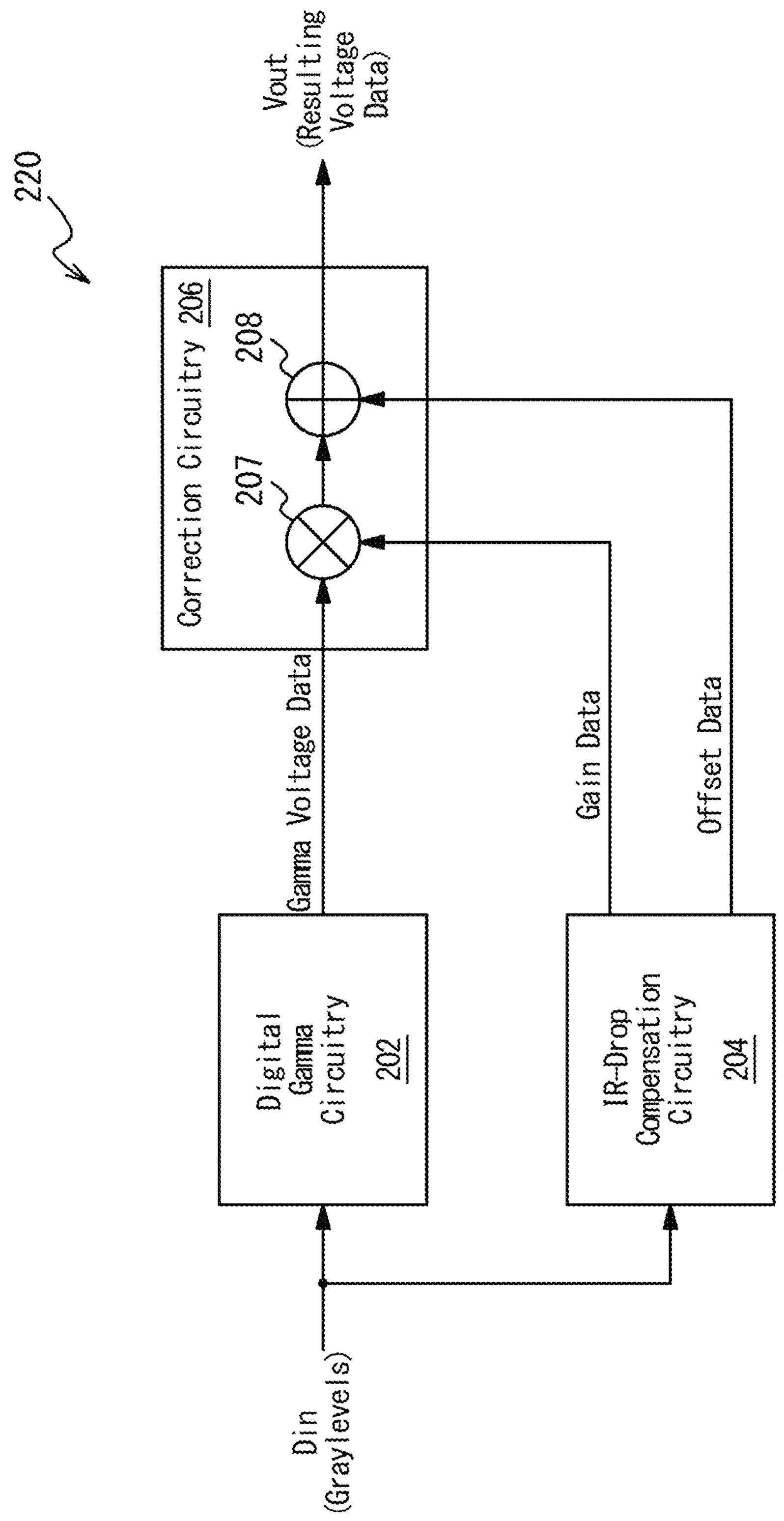
FIG. 7 illustrates an example configuration of image processing circuitry, according to one or more embodiments.

FIG. 7 illustrates an example configuration of the image processing circuitry 220, according to one or more embodiments. In the illustrated embodiment, the image processing circuitry 220 includes digital gamma circuitry 202, IR-drop compensation circuitry 204, and correction circuitry 206.

The digital gamma circuitry 202 is configured to apply a gamma transformation to the image data Din to generate gamma voltage data. The gamma voltage data may include voltage levels of gamma voltages with which the respective subpixels 106 are to be updated to display an image corresponding to the image data Din on the display panel 100 with specified gamma characteristics (e.g., in accordance with a gamma value of 2.2). The voltage level of a gamma voltage may be referred to as the gamma voltage level. The gamma voltage data may include gamma voltage levels for the R subpixels 106R, gamma voltage levels for the G subpixels 106G, and gamma voltage levels for the B subpixels 106B.

The IR-drop compensation circuitry 204 and the correction circuitry 206 are collectively configured to generate the resulting voltage data Vout supplied to the drive circuitry 230 (illustrated in FIG. 5) through applying an IR-drop compensation to the gamma voltage data generated by the digital gamma circuitry 202. As discussed above, the IR-drop compensation compensates the IR-drop over the power source lines 114 in the display panel 100.

More specifically, the IR-drop compensation circuitry 204 is configured to generate gain data and offset data used for the IR-drop compensation. The gain data includes compensation gains for the respective subpixels 106, and the offset data includes compensation offsets for the respective subpixels 106. In one implementation, the IR-drop compensation circuitry 204 may be configured to receive the image data Din for the respective subpixels 106 and determine the total current of the display panel 100 based at least in part on the image data Din. The gain data (or compensation gain) for a subpixel 106 may be generated based at least in part on the total current and the position of the subpixel 106. Further, the offset data (or compensation offset) for the subpixel 106 may be generated based at least in part on the total current and the graylevel of the subpixel 106 indicated by the image data Din. Details of the IR-drop compensation circuitry 204 will be given later.

The correction circuitry 206 is configured to correct or modify gamma voltage levels of the gamma voltage data based at least in part on the gain data and offset data to generate the resulting voltage data Vout. In the illustrated embodiment, the correction circuitry 206 includes multiplier circuitry 207 and adder circuitry 208. The multiplier circuitry 207 is configured to multiply the gamma voltage data with the compensation gains and the adder circuitry 208 is configured to add the compensation offsets to the multiplied gamma voltage data to generate the resulting voltage data Vout. In one implementation, the voltage level of the resulting voltage data Vout for each subpixel 106 may be determined by adding the compensation offset for the subpixel 106 to the product acquired by multiplying the gamma voltage level for the subpixel 106 by the compensation gain for the subpixel 106.

Figure 8:
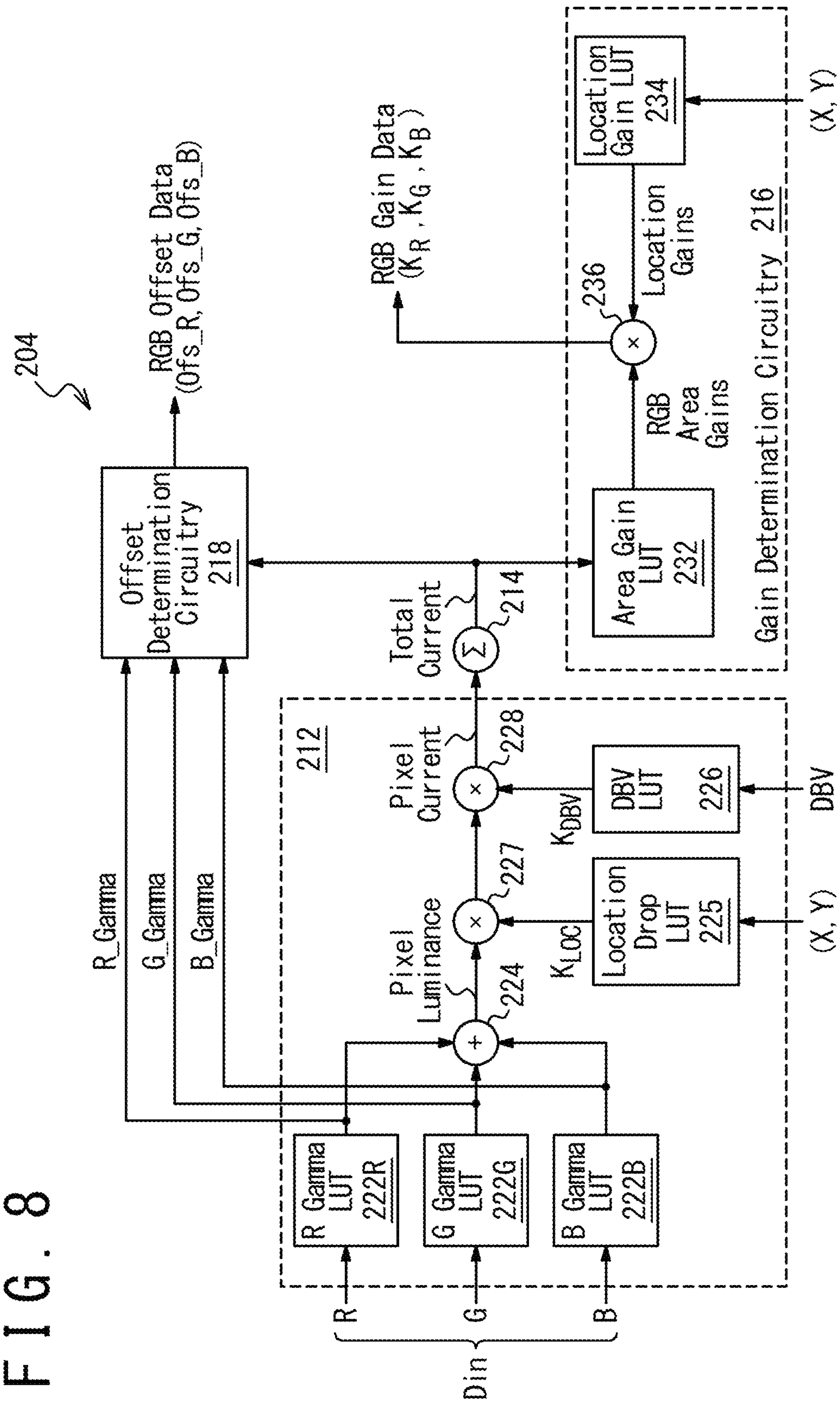
FIG. 8 illustrates an example configuration of IR-drop compensation circuitry, according to one or more embodiments.

FIG. 8 illustrates an example configuration of the IR-drop compensation circuitry 204, according to one or more embodiments. In the illustrated embodiment, the image data Din provided to the IR-drop compensation circuitry 204 includes graylevels of the R subpixels 106R, the G subpixels 106G, and the B subpixels 106B. The graylevels of an R subpixel 106R, a G subpixel 106G, and B subpixel 106B may be hereinafter simply referred to as R graylevel, G graylevel, and B graylevel, respectively. In FIG. 8, the R, G, and B graylevels indicated by the image data Din are denoted by “R”, “G”, and “B”, respectively.

In one or more embodiments, the IR-drop compensation circuitry 204 includes pixel current determination circuitry 212, accumulator circuitry 214, gain determination circuitry 216, and offset determination circuitry 218. The pixel current determination circuitry 212 is configured to determine the pixel current that travels through each pixel (e.g., the pixels 110 and 120 illustrated in FIGS. 6A and 6B) based on the image data Din for the pixel, the position (X, Y) of the pixel, and the DBV. In the illustrated embodiment, the pixel current determination circuitry 212 includes an R gamma lookup table (LUT) 222R, a G gamma LUT 222G, a B gamma LUT 222B, an adder 224, a location drop compensation LUT 225, a display brightness value (DBV) LUT 226, and multipliers 227 and 228.

The R, G, and B gamma LUTs 222R, 222G, and 222B and the adder 224 are collectively configured to determine, based on the R, G, and B graylevels of each pixel, the pixel luminance of each pixel for the case where the DBV is a specific value, for example, the maximum DBV. The R gamma LUT 222R is configured to determine the R luminance R_Gamma of each pixel based on the R graylevel, where the R luminance R_Gamma is the luminance of the R subpixel 106R of the pixel. In one implementation, the R gamma LUT 222R describes the correspondence between the R graylevel and the R luminance R_Gamma for the case where the DBV is the specific value (e.g., the maximum DBV.) In one implementation, the R luminance of each pixel is determined through a table lookup on the R gamma LUT 222R with reference to the R graylevel.

The G gamma LUT 222G is configured to determine the G luminance G_Gamma of each pixel based on the G graylevel, where the G luminance G_Gamma is the luminance of the G subpixel 106G of the pixel. The G gamma LUT 222G describes the correspondence between the G graylevel and the G luminance for the case where the DBV is the specific value. In one implementation, the G luminance of each pixel is determined through a table lookup on the G gamma LUT 222G with reference to the G graylevel.

The B gamma LUT 222B is configured to determine the B luminance B_Gamma of each pixel based on the B graylevel, where the B luminance B_Gamma is the luminance of the B subpixel 106B of the pixel. In one implementation, the B gamma LUT 222B describes the correspondence between the B graylevel and the B luminance B_Gamma for the case where the DBV is the specific value. In one or more embodiments, the B luminance of each pixel is determined through a table lookup on the B gamma LUT 222B with reference to the B graylevel.

The adder 224 is configured to determine the pixel luminance of each pixel for the case where the DBV is the specific value by adding up the R luminance, G luminance, and B luminance of each pixel, which are determined by the R, G, and B gamma LUTs 222R, 222G, and 222B.

The location drop compensation LUT 225 is configured to determine a location drop compensation gain $K_{LOC}$ for each pixel. The location drop compensation gain $K_{LOC}$ is used to compensate the effect of the IR-drop across the power source lines 114 on the pixel luminance of each pixel. The location drop compensation gain $K_{LOC}$ is determined based on the position (X, Y) of the pixel in the display panel 100. In one implementation, the location drop compensation LUT 225 may be configured to store the correspondence between the position (X, Y) of the pixel and the location drop compensation gain $K_{LOC}$, and the location drop compensation gain $K_{LOC}$ may be determined through a table lookup on the location drop compensation LUT 225 with reference to the position (X, Y) of the pixel.

The DBV LUT 226 is configured to determine a DBV-dependent gain $K_{DBV}$ that represents the dependency of the luminance of the pixel on the DBV. In one implementation, the DBV LUT 226 may be configured to store the correspondence between the value DBV and the DBV-dependent gain $K_{DBV}$, and the DBV-dependent gain $K_{DBV}$ may be determined through a table lookup on the DBV LUT 226 with reference to the DBV.

The multipliers 227 and 228 are configured to determine the pixel current of each pixel by multiplying the pixel luminance calculated for the pixel by the location drop compensation gain $K_{LOC}$ and the DBV-dependent gain $K_{DBV}$. The determined pixel luminance for each pixel is provided to the accumulator circuitry 214.

The accumulator circuitry 214 is configured to accumulate or add up the pixel currents for all the pixels of the display panel 100 to determine the total current of the display panel 100.

The gain determination circuitry 216 is configured to generate the gain data for the respective subpixels 106 based on the total current of the display panel 100 and the positions of the corresponding subpixels 106 in the display panel 100. In the illustrated embodiment, the gain data includes compensation gains $K_R$ for the R subpixels 106R, compensation gains $K_G$ for the G subpixels 106G, and compensation gains $K_B$ for the B subpixels 106B. In the illustrated embodiment, the gain determination circuitry 216 includes an area gain LUT 232, a location gain LUT 234, and compensation gain calculation circuitry 236.

The area gain LUT 232 is configured to generate, based on the total current of the display panel 100, an R area gain for the R subpixels 106R, a G area gain for the G subpixels 106G, and a B area gain for the B subpixels 106B. The R, G, and B area gains may correspond to total-current-dependent factors of the compensation gains $K_R$, $K_G$, and $K_B$, respectively. In one implementation, the area gain LUT 232 may be configured to store the correspondence between the R area gain and the total current, the correspondence of the G area gain and the total current, and the correspondence between the B area gain and the total current. The R, G, and B area gains may be generated through table lookups on the area gain LUT 232 with reference to the total current.

The location gain LUT 234 is configured to generate location gains for respective subpixels 106 based on the positions of the respective subpixels 106. The location gains may correspond to position-dependent factors of the compensation gains $K_R$, $K_G$, and $K_B$. The location gain LUT 234 may be configured to store the correspondence between the location gains and the positions of the subpixels 106. The location gain for a subpixel 106 of interest may be determined through a table lookup on the location gain LUT 234 with reference to the position (X, Y) of the pixel that include the subpixel 106 of interest.

The compensation gain calculation circuitry 236 is configured to determine the compensation gains for the respective subpixels 106 based on the R, G, and B area gains received from the area gain LUT 232 and the location gains received from the location gain LUT 234. In one implementation, the compensation gain calculation circuitry 236 may be a multiplier configured to determine the compensation gain $K_R$ for each R subpixel 106R as the product of the R area gain and the location gain for the R subpixel 106R, the compensation gain $K_G$ for each G subpixel 106G as the product of the G area gain and the location gain for the G subpixel 106G, and the compensation gain $K_B$ for each B subpixel 106B as the product of the B area gain and the location gain for the B subpixel 106B.

The offset determination circuitry 218 is configured to generate the offset data for the respective subpixels 106 based on the total current of the display panel 100 and the graylevels of the corresponding subpixels 106 indicated by the image data Din. In the illustrated embodiment, the offset data includes compensation offsets Ofs_R for the R subpixels 106R, compensation offsets Ofs_G for the G subpixels 106G, and compensation offsets Ofs_B for the B subpixels 106B.

In one implementation, the offset determination circuitry 218 may be configured to determine the compensation offset Ofs_R for an R subpixel 106R based on the luminance of the R subpixel 106R (i.e., the R luminance R_Gamma) and the total current. The offset determination circuitry 218 may be further configured to determine the compensation offset Ofs_G for a G subpixel 106G based on the luminance of the G subpixel 106G (i.e., the G luminance G_Gamma) and the total current. The offset determination circuitry 218 may be further configured to determine the compensation offset Ofs_B for a B subpixel 106B based on the luminance of the B subpixel 106B (i.e., the B luminance B_Gamma) and the total current. Since the R luminance R_Gamma, the G luminance G_Gamma, and the B luminance B_Gamma (or the graylevels of the R subpixel 106R, the G subpixel 106G, and the B subpixel 106B) at least partially represent the luminance of the foreground image (described in relation to FIG. 3) while the total current at least partially represents the luminance of the background image, the offset determination circuitry 218 can properly determine the compensation offsets Ofs_R, Ofs_G, and Ofs_B to provide a precise IR-drop compensation in view of the luminance difference between the foreground image and the background image.

The gain data (which includes the compensation gains $K_R$, $K_G$, and $K_B$) generated by the gain determination circuitry 216 and the offset data (which includes the compensation offsets Ofs_R, Ofs_G, and Ofs_B) generated by the offset determination circuitry 218 are provided to the correction circuitry 206, which is illustrated in FIG. 7. The correction circuitry 206 is configured to generate the resulting voltage data Vout by modifying or correct the gamma voltage levels for the respective subpixels 106 of the gamma voltage data based on the gain data and the offset data. In some embodiments, the voltage level of the resulting voltage data Vout for an R subpixel 106R may be generated by adding the compensation offset Ofs_R for the R subpixel 106R to the product acquired by multiplying the gamma voltage level for the R subpixel 106R by the compensation gain $K_R$ for the R subpixel 106R. Further, the voltage level of the resulting voltage data Vout for an G subpixel 106G may be generated by adding the compensation offset Ofs_G for the G subpixel 106G to the product acquired by multiplying the gamma voltage level for the G subpixel 106G by the compensation gain $K_G$ for the G subpixel 106G. Further, the voltage level of the resulting voltage data Vout for an B subpixel 106B may be generated by adding the compensation offset Ofs_B for the B subpixel 106B to the product acquired by multiplying the gamma voltage level for the B subpixel 106B by the compensation gain $K_B$ for the B subpixel 106B. In one implementation, the voltage levels of the resulting voltage data Vout for an R subpixel 106R, a G subpixel 106G, and a B subpixel 106B may be determined in accordance with the following expressions (1) to (3):

$$Rout=K_R \cdot Rg+Ofs\_R, \tag{1}$$

$$Gout=K_G \cdot Gg+Ofs\_G, \text{ and} \tag{2}$$

$$Bout=K_B \cdot Bg+Ofs\_B, \tag{3}$$

where Rg, Gg, and Bg are the gamma voltage levels of the gamma voltage data for the R subpixel 106R, the G subpixel 106G, and the B subpixel 106B, respectively, and Rout, Gout, and Bout are the voltage levels of the resulting voltage data Vout for the R subpixel 106R, the G subpixel 106G, and the B subpixel 106B, respectively.

Figure 9A:
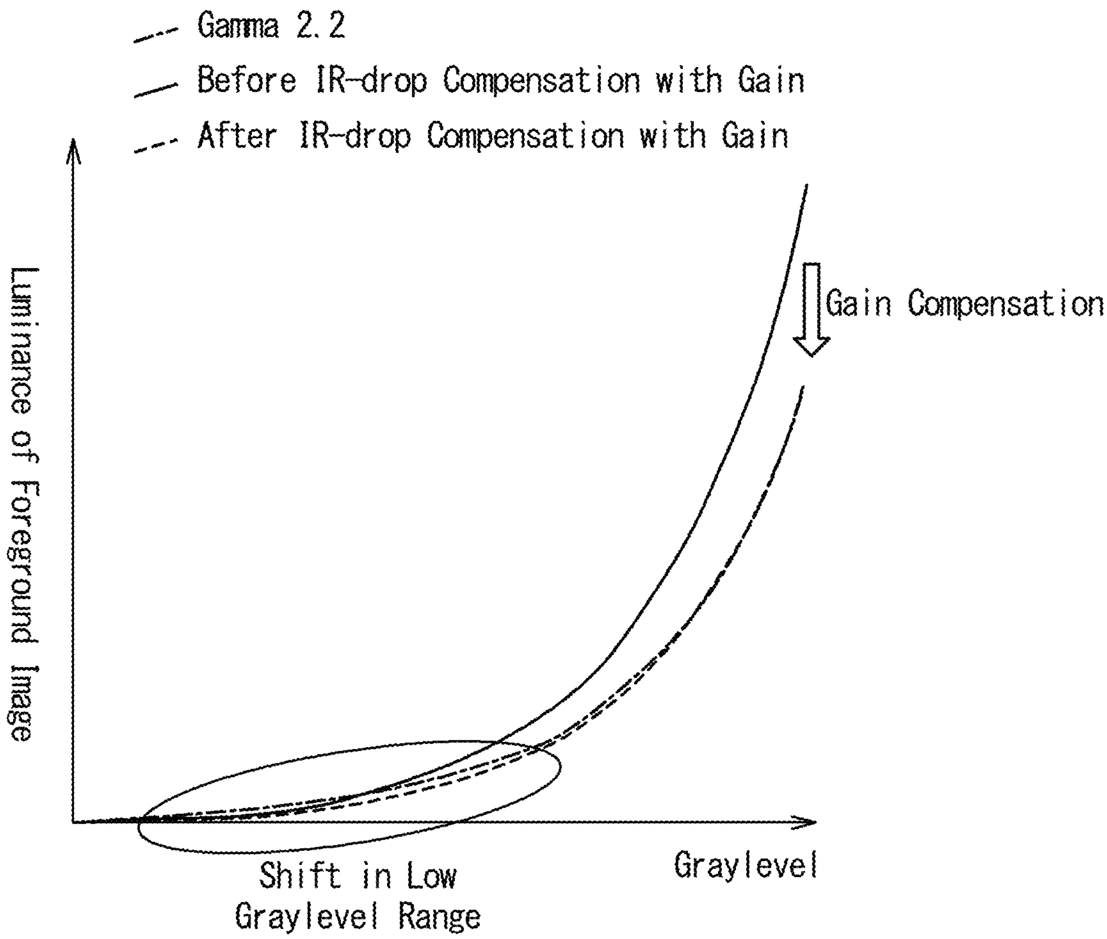
FIG. 9A illustrates an example result of the IR-drop compensation that solely uses compensation gains, according to one or more embodiments.
Figure 9B:
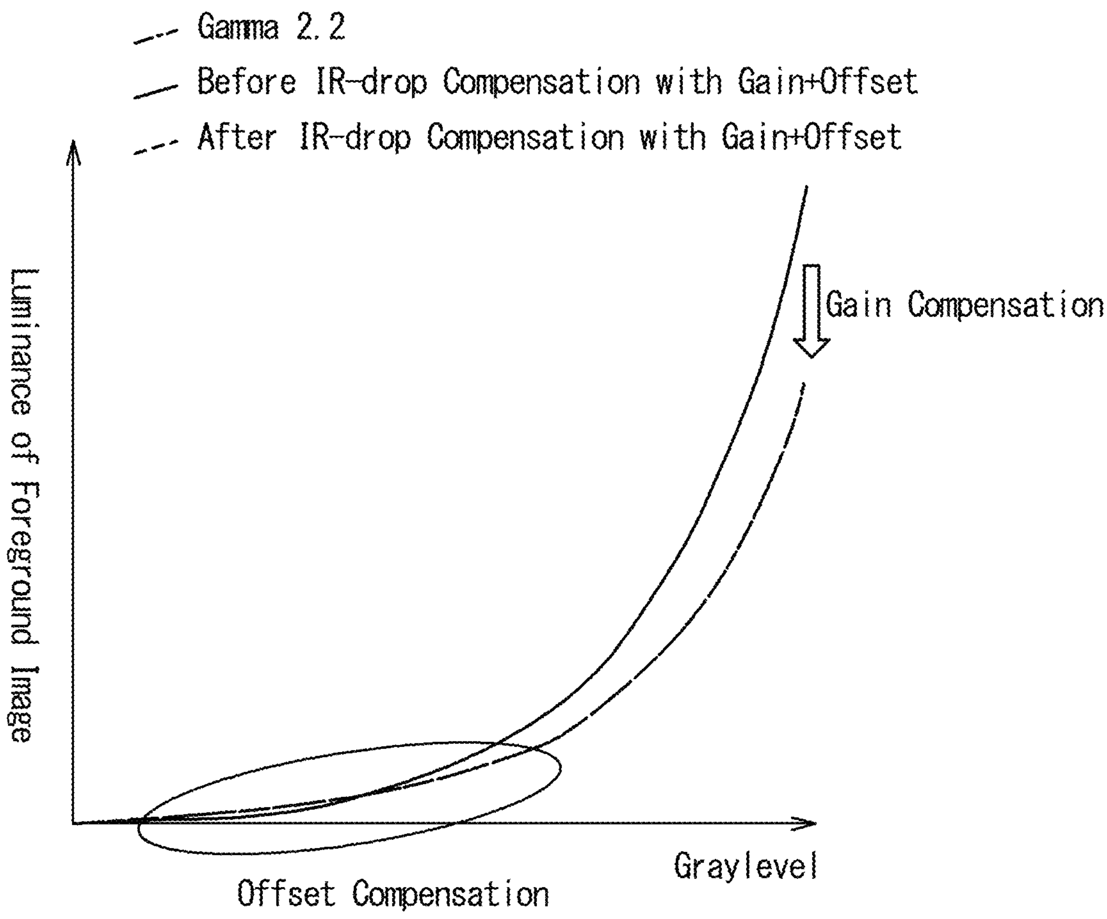
FIG. 9B illustrates an example result of the IR-drop compensation that uses compensation gains and compensation offsets, according to one or more embodiments.

The use of the compensation offsets Ofs_R, Ofs_G, and Ofs_B in addition to the compensation gains $K_R$, $K_G$, and $K_B$ in the IR-drop compensation effectively improves the accuracy of the IR-drop compensation compared with the case where only the compensation gains $K_R$, $K_G$, and $K_B$ are used. FIG. 9A illustrates an example result of the IR-drop compensation that solely uses compensation gains while FIG. 9B illustrates an example result of the IR-drop compensation that uses compensation offsets in addition to compensation gains. Each of FIGS. 9A and 9B illustrates graylevel-luminance curves before and after the IR-drop compensation. FIG. 9A and FIG. 9B further illustrates the ideal graylevel-luminance curve defined by a gamma value of 2.2, which is the de facto standard of display devices. The graylevel-luminance curve after the IR-drop compensation is desired to be coincident with the ideal graylevel-luminance curve. Although the IR-drop compensation that solely uses the compensation gains may makes the graylevel luminance curve after the IR-drop compensation closer to the ideal graylevel-luminance curve, there still remains a compensation error in a low graylevel region as indicated by the ellipse in FIG. 9A. As illustrated in FIG. 9B, the use of the compensation offsets in addition to the compensation gains effectively improves the accuracy of the IR-drop compensation especially in the low graylevel region.

In some embodiments, to effectively compensate the luminance reduction in the low graylevel region, the offset determination circuitry 218 may be configured to determine the compensation offset Ofs_R for an R subpixel 106R such that the compensation offset Ofs_R increases as the graylevel of the R subpixel 106R decreases. Correspondingly, the offset determination circuitry 218 may be further configured to determine the compensation offset Ofs_G for an G subpixel 106G such that the compensation offset Ofs_G increases as the graylevel of the G subpixel 106G decreases. The offset determination circuitry 218 may be further configured to determine the compensation offset Ofs_B for an B subpixel 106B such that the compensation offset Ofs_B increases as the graylevel of the B subpixel 106B decreases.

Additionally, or alternatively, the offset determination circuitry 218 may be configured to determine the compensation offsets Ofs_R, Ofs_G, and Ofs_B such that the compensation offsets Ofs_R, Ofs_G, and Ofs_B increase as the total current increases. By increasing the compensation offsets Ofs_R, Ofs_G, and Ofs_B as the total current increases, it is possible to effectively compensate an increase in the IR-drop caused by the increase in the total current.

Figure 10:
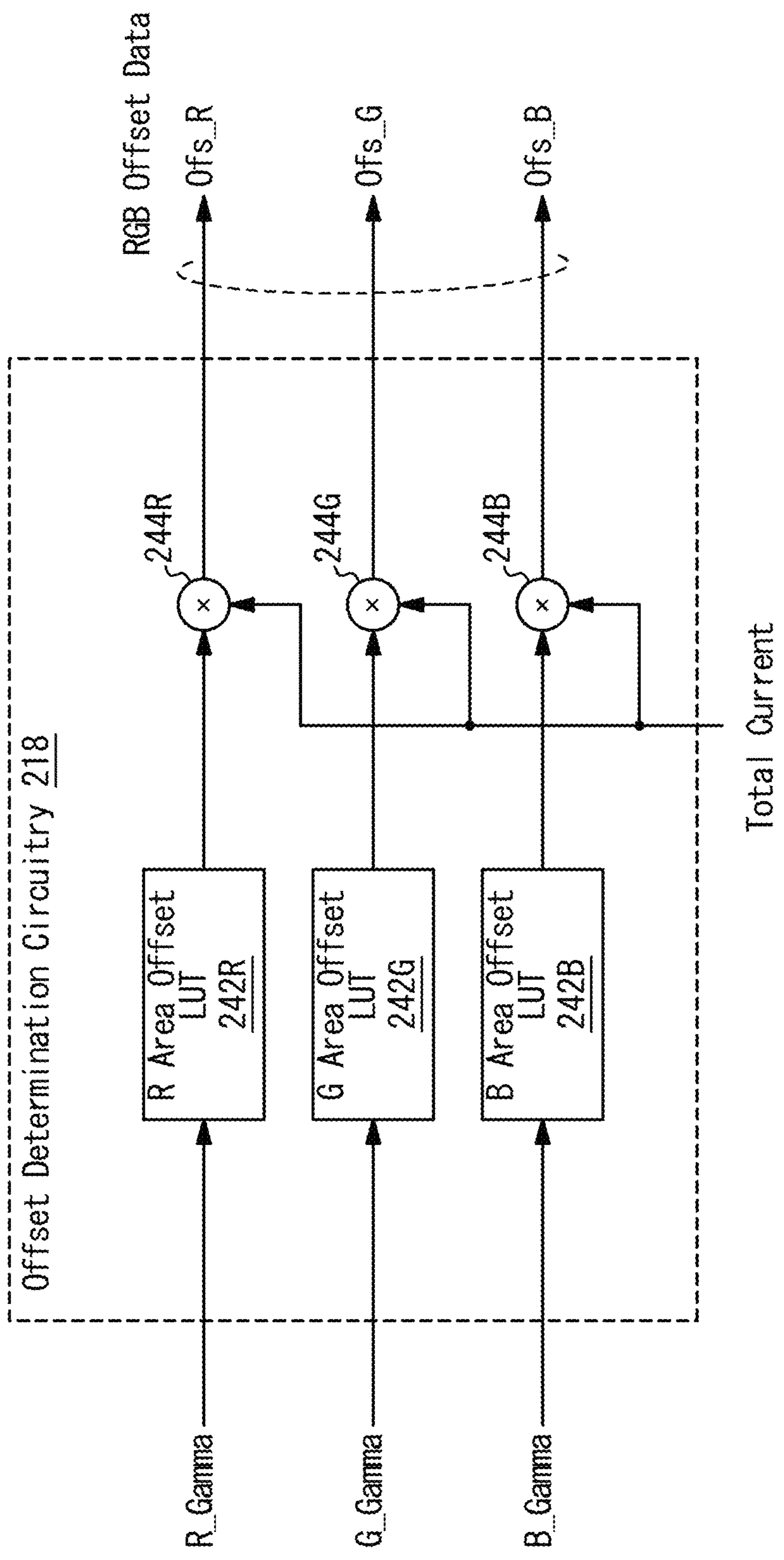
FIG. 10 illustrates an example configuration of offset determination circuitry, according to one or more embodiments.

FIG. 10 illustrates an example configuration of the offset determination circuitry 218, according to one or more embodiments. In the illustrated embodiments, the offset determination circuitry 218 includes an R area offset LUT 242R, an G area offset LUT 242G, a B area offset LUT 242B, and multipliers 244R, 244G, and 244B.

The R area offset LUT 242R and the multiplier 244R are collectively configured to generate the compensation offset Ofs_R for each R subpixel 106R based on the R luminance R_Gamma of the R subpixel 106R and the total current. The R area offset LUT 242R is configured to determine an R base compensation offset for each R subpixel 106R based on the R luminance R_Gamma. In one implementation, the R area offset LUT 242R may be configured to store the correspondence between the R base compensation offset and the R luminance R_Gamma, and the R base compensation offset may be determined through a table lookup on the R area offset LUT 242R with reference to the R luminance R_Gamma. In one implementation, the R area offset LUT 242R may be configured such that the R base compensation offset increases as the R luminance R_Gamma (or the graylevel of the R subpixel 106R) decreases. By increasing the R base compensation offset as the R luminance R_Gamma decreases, it is possible to precisely compensate the luminance reduction caused by the IR-drop for reduced R graylevels. The multiplier 244R is configured to generate the compensation offset Ofs_R for each R subpixel 106R by multiplying the R base compensation offset for the R subpixel 106R by a factor determined based on the total current. In one implementation, the factor is determined such that the compensation offset Ofs_R increases as the total current increases, since the IR-drop increases as the total current increases.

The G area offset LUT 242G and the multiplier 244G are collectively configured to generate the compensation offset Ofs_G for each G subpixel 106G based on the G luminance G_Gamma of the G subpixel 106G and the total current. The G area offset LUT 242G is configured to determine a G base compensation offset for each G subpixel 106G based on the G luminance G_Gamma. In one implementation, the G area offset LUT 242G may be configured to store the correspondence between the G base compensation offset and the G luminance G_Gamma, and the G base compensation offset may be determined through a table lookup on the G area offset LUT 242G with reference to the G luminance G_Gamma. In one implementation, the G area offset LUT 242G may be configured such that the G base compensation offset increases as the G luminance G_Gamma (or the graylevel of the G subpixel 106G) decreases. By increasing the G base compensation offset as the G luminance G_Gamma decreases, it is possible to precisely compensate the luminance reduction caused by the IR-drop for reduced G graylevels. The multiplier 244G is configured to generate the compensation offset Ofs_G for each G subpixel 106G by multiplying the G base compensation offset for the G subpixel 106G by a factor determined based on the total current. In one implementation, the factor is determined such that the compensation offset Ofs_G increases as the total current increases, since the IR-drop increases as the total current increases.

The B area offset LUT 242B and the multiplier 244B are collectively configured to generate the compensation offset Ofs_B for each B subpixel 106B based on the B luminance B_Gamma for the B subpixel 106B and the total current. The B area offset LUT 242B is configured to determine a B base compensation offset for each B subpixel 106B based on the B luminance B_Gamma. In one implementation, the B area offset LUT 242B may be configured to store the correspondence between the B base compensation offset and the B luminance B_Gamma, and the B base compensation offset may be determined through a table lookup on the B area offset LUT 242B with reference to the B luminance B_Gamma. In one implementation, the B area offset LUT 242B may be configured such that the B base compensation offset increases as the B luminance B_Gamma (or the graylevel of the B subpixel 106B) decreases. By increasing the B base compensation offset as the B luminance B_Gamma decreases, it is possible to precisely compensate the luminance reduction caused by the IR-drop for reduced B graylevels. The multiplier 244B is configured to generate the compensation offset Ofs_B for each B subpixel 106B by multiplying the B base compensation offset for the B subpixel 106B by a factor determined based on the total current. In one implementation, the factor is determined such that the compensation offset Ofs_B increases as the total current increases, since the IR-drop increases as the total current increases.

In some embodiments, the multipliers 244R, 244G, and 244B may be omitted. In such embodiments, the outputs of the R area offset LUT 242R, the G area offset LUT 242G, and the B area offset LUT 242B may be used as the compensation offset Ofs_R, Ofs_G, and Ofs_B, respectively.

Figure 11A:
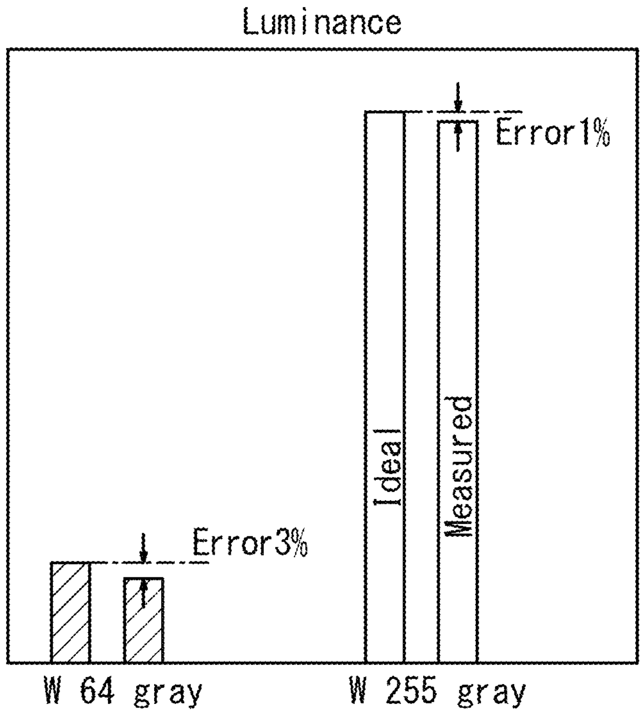
FIG. 11A illustrates an example result of an IR-drop compensation that uses compensation gains and compensation offsets, according to one or more embodiments.
Figure 11B:
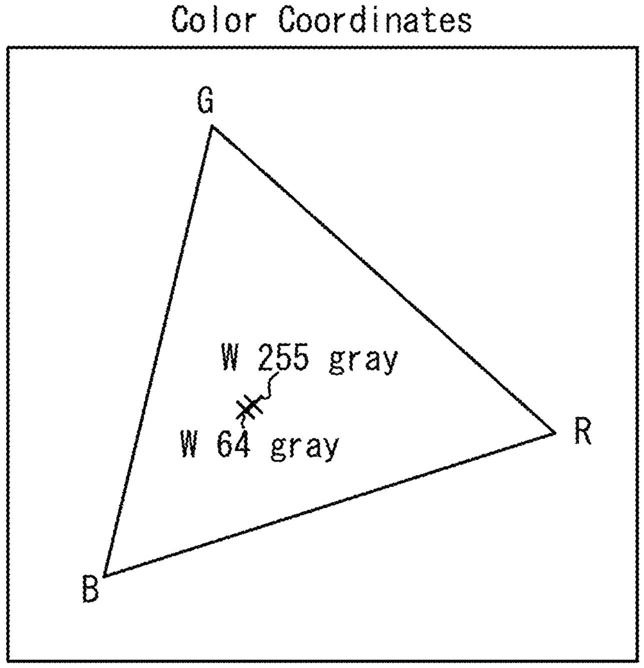
FIG. 11B illustrates color coordinates of a foreground image and a background image after applying an IR-drop compensation that uses compensation gains and compensation offsets, according to one or more embodiments.

FIG. 11A and FIG. 11B illustrate an example result of an IR-drop compensation using compensation gains and compensation offsets for the display image illustrated in FIG. 3. As illustrated in FIG. 11A, the IR-drop compensation using compensation gains and compensation offsets may effectively reduce the luminance error of the foreground image as well as the luminance error of the background image. Further, as illustrated in FIG. 11B, the IR-drop compensation using compensation gains and compensation offsets may effectively reduce the color shift of the foreground image.

Figure 12:
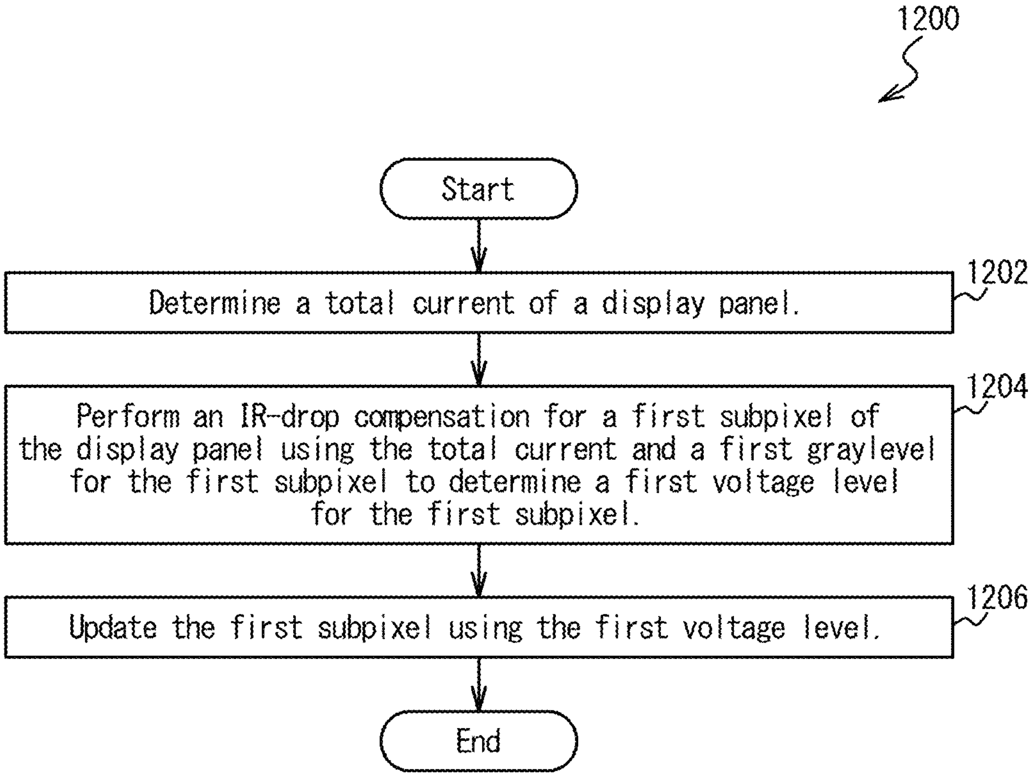
FIG. 12 illustrates an example method of driving a display panel, according to one or more embodiments.

Method 1200 of FIG. 12 illustrates example steps for driving a display panel (e.g., the display panel 100 in FIG. 5), according to one or more embodiments. It is noted that one or more of the steps illustrated in FIG. 12 may be omitted, repeated, and/or performed in a different order than the order illustrated in FIG. 12. It is further noted that two or more steps may be implemented at the same time.

The method 1200 includes determining a total current of a display panel at step 1202. The total current may be the sum of the currents travelling through all the subpixels (e.g., the subpixels 106 in FIG. 5) of the display panel. The method 1200 further includes performing an IR-drop compensation for a first subpixel (e.g., a subpixel 106) of the display panel using the total current and a first graylevel for the first subpixel to determine a first voltage level for the first subpixel at step 1204. The IR drop-compensation may be further based on the position of the first subpixel. The method 1200 further includes updating the first subpixel using the first voltage level at step 1206.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:

image processing circuitry configured to:

determine a total current of a display panel, and perform an IR-drop compensation using the total current and a first graylevel for a first subpixel of the display panel to determine a first voltage level for the first subpixel using gamma voltage data, gain data, and offset data, wherein the total current is used to determine the gain data, the total current and the first graylevel of the first subpixel are used to determine the offset data, and the offset data corresponds to a difference in luminance between a foreground image and a background image; and drive circuitry configured to update the first subpixel based at least in part on the first voltage level.

2. The display driver of claim 1, wherein the image processing circuitry is further configured to:

apply a gamma transformation to the first graylevel for the first subpixel to determine a gamma voltage level for the first subpixel, and modify the gamma voltage level to determine the first voltage level.

3. The display driver of claim 2, wherein modifying the gamma voltage level comprises:

determining a compensation offset based at least in part on the total current and/or the first graylevel for the first subpixel, and modifying the gamma voltage level based at least in part on the compensation offset.

4. The display driver of claim 3, wherein the compensation offset increases as the first graylevel decreases.

5. The display driver of claim 3, wherein the compensation offset increase as the total current increases.

6. The display driver of claim 3, wherein modifying the gamma voltage level further comprises:

determining a compensation gain based at least in part on the total current, wherein modifying the gamma voltage level is further based at least in part on the compensation gain.

7. The display driver of claim 6, wherein determining the compensation gain is further based at least in part on a location of the first subpixel.

8. The display driver of claim 1, wherein the first subpixel is of a first color, the image processing circuitry is further configured to:

determine a second voltage level for a second subpixel of the display panel, using the total current and a second graylevel for the second subpixel, wherein the second subpixel is of a second color different from the first color, and the drive circuitry is further configured to update the second subpixel based at least in part on the second voltage level.

9. A display device, comprising:

a display panel; and a display driver configured to:

determine a total current of the display panel, perform an IR-drop compensation using the total current and a first graylevel for a first subpixel of the display panel to determine a first voltage level for the first subpixel using gamma voltage data, gain data, and offset data, wherein the total current is used to determine the gain data, the total current and the first graylevel of the first subpixel are used to determine the offset data, and the offset data corresponds to a difference in luminance between a foreground image and a background image; and update the first subpixel using the first voltage level.

10. The display device of claim 9, wherein the display driver is further configured to:

apply a gamma transformation to the first graylevel for the first subpixel to determine a gamma voltage level for the first subpixel, and modify the gamma voltage level to determine the first voltage level.

11. The display device of claim 10, wherein modifying the gamma voltage level comprises:

determining a compensation offset based at least in part on at least one of the total current and the first graylevel for the first subpixel, and modifying the gamma voltage level based at least in part on the compensation offset.

12. The display device of claim 11, wherein the compensation offset increases as the first graylevel decreases.

13. The display device of claim 11, wherein the compensation offset increase as the total current increases.

14. The display device of claim 11, wherein modifying the gamma voltage level further comprises:

determining a compensation gain based at least in part on the total current, wherein modifying the gamma voltage level is further based at least in part on the compensation gain.

15. A method, comprising:

determining a total current of a display panel;

performing an IR-drop compensation using the total current and a first graylevel for a first subpixel of the display panel to determine a first voltage level for the first subpixel of the display panel using gamma voltage data, gain data, and offset data, wherein the total current is used to determine the gain data, the total current and the first graylevel of the first subpixel are used to determine the offset data, and the offset data corresponds to a difference in luminance between a foreground image and a background image; and updating the first subpixel using the first voltage level.

16. The method of claim 15, further comprising:

applying a gamma transformation to the first graylevel for the first subpixel to determine a gamma voltage level for the first subpixel; and modifying the gamma voltage level to determine the first voltage level.

17. The method of claim 16, wherein modifying the gamma voltage level comprises:

determining a compensation offset based at least in part on at least one of the total current and the first graylevel for the first subpixel; and modifying the gamma voltage level based at least in part on the compensation offset.

18. The method of claim 17, wherein the compensation offset increases as the first graylevel decreases.

19. The method of claim 17, wherein the compensation offset increase as the total current increases.

20. The method of claim 17, wherein modifying the gamma voltage level further comprises:

determining a compensation gain based on the total current, wherein modifying the gamma voltage level is further based at least in part on the compensation gain.

* * * * *